US010606442B2

(12) United States Patent
Katz

(10) Patent No.: US 10,606,442 B2
(45) Date of Patent: Mar. 31, 2020

(54) TOUCH-FREE GESTURE RECOGNITION SYSTEM AND METHOD

(71) Applicant: EYESIGHT MOBILE TECHNOLOGIES LTD., Herzliya (IL)

(72) Inventor: Itay Katz, Tel Aviv (IL)

(73) Assignee: Eyesight Mobile Technologies, Ltd., Herzliya (IL)

(*) Notice: Subject to any disclaimer, the term of this patent is extended or adjusted under 35 U.S.C. 154(b) by 71 days.

(21) Appl. No.: 15/675,981

(22) Filed: Aug. 14, 2017

(65) Prior Publication Data

US 2017/0344222 A1 Nov. 30, 2017

Related U.S. Application Data

(63) Continuation of application No. 14/236,492, filed as application No. PCT/IL2012/050290 on Aug. 2, 2012, now Pat. No. 9,733,789.

(Continued)

(51) Int. Cl.
G06F 3/0481 (2013.01)
G06F 3/01 (2006.01)
(Continued)

(52) U.S. Cl.
CPC .......... *G06F 3/04815* (2013.01); *G06F 3/013* (2013.01); *G06F 3/017* (2013.01);
(Continued)

(58) Field of Classification Search
CPC ..... G06F 3/00; G06F 3/01; G06F 3/03; G06F 3/033; G06F 3/041; G06F 3/048;
(Continued)

(56) References Cited

U.S. PATENT DOCUMENTS 5,729,249 A * 3/1998 Yasutake ............... G06F 3/0338
345/157
6,283,860 B1 * 9/2001 Lyons ..................... A63F 13/06
463/36

(Continued)

FOREIGN PATENT DOCUMENTS

CN 101957719 A 1/2011
EP 2 278 823 1/2011
(Continued)

OTHER PUBLICATIONS

International Search Report for PCT International Application No. PCT/IL2012/050290, dated Mar. 14, 2013 (4 pages).

*Primary Examiner* — Xiomara L Bautista

(74) *Attorney, Agent, or Firm* — Finnegan, Henderson, Farabow, Garrett & Dunner LLP

(57) ABSTRACT

The present invention provides a system and method for interacting with a 3D virtual image containing activatable objects. The system of the invention includes a 3D display device that presents to a user a 3D image, an image sensor and a processor. The processor analyzes images obtained by the image sensor to determine when the user has placed an activating object such as a hand or a finger, or has performed a gesture related to an activatable object, in the 3D space, at the location where the user perceives an activatable object to be located. The user thus perceives that he is "touching" the activatable object with the activating object.

20 Claims, 3 Drawing Sheets

Related U.S. Application Data

(60) Provisional application No. 61/515,055, filed on Aug. 4, 2011.

(51) Int. Cl.
*G06F 3/03* (2006.01)
*G06F 3/0484* (2013.01)
*G06F 3/0482* (2013.01)
*G06F 3/16* (2006.01)

(52) U.S. Cl.
CPC .......... *G06F 3/0304* (2013.01); *G06F 3/0482* (2013.01); *G06F 3/04842* (2013.01); *G06F 3/167* (2013.01)

(58) Field of Classification Search
CPC .... G06F 3/0481; G06F 3/0484; G06F 3/0488; G06F 17/00
See application file for complete search history.

(56) References Cited

U.S. PATENT DOCUMENTS

| | | | |
|---|---|---|---|
| 6,788,809 B1 | 9/2004 | Grzeszczuk et al. | |
| 7,216,305 B1 | 5/2007 | Jaeger | |
| 7,274,803 B1 | 9/2007 | Sharma et al. | |
| 7,340,077 B2 | 3/2008 | Gokturk et al. | |
| 8,230,367 B2 | 7/2012 | Bell et al. | |
| 8,289,316 B1 | 10/2012 | Reisman et al. | |
| 8,669,953 B2 | 3/2014 | Kim | |
| 8,866,810 B2 | 10/2014 | Cho et al. | |
| 2003/0016247 A1 | 1/2003 | Lai | |
| 2003/0113018 A1 | 6/2003 | Neflan et al. | |
| 2004/117727 A1 | 6/2004 | Wada | |
| 2006/0132432 A1 | 6/2006 | Bell | |
| 2008/0013793 A1* | 1/2008 | Hillis | G03H 1/0005 382/114 |
| 2008/0174551 A1 | 7/2008 | Ishibashi | |
| 2009/0089714 A1 | 4/2009 | Blake | |
| 2010/0315417 A1 | 12/2010 | Cho et al. | |
| 2011/0012830 A1 | 1/2011 | Yeh | |
| 2011/0187709 A1* | 8/2011 | Lee | G06F 3/041 345/419 |
| 2012/0260217 A1 | 10/2012 | Celebisoy | |
| 2012/0317511 A1 | 12/2012 | Bell | |
| 2013/0321271 A1 | 12/2013 | Bychkov | |

FOREIGN PATENT DOCUMENTS

| | | |
|---|---|---|
| WO | WO 2009/035705 | 3/2009 |
| WO | WO 2008/132724 | 11/2009 |

* cited by examiner

TOUCH-FREE GESTURE RECOGNITION SYSTEM AND METHOD

FIELD OF THE INVENTION

This invention relates to user interlaces.

BACKGROUND OF THE INVENTION

The following publication is considered to be relevant for an understanding of the background of the invention:

WO 2008/132724

The term "3D display" is used to refer to a display device capable of conveying depth perception to a viewer by means of stereopsis for binocular vision. A user observing an image on a 3D display device has the sensation that the objects in the image are arranged in a 3D array in front of the display device. Some of the objects in a 3D image may appear to be floating in space in front of the display device. The technology has been used to show stereo films, images or games. Head-mounted displays may also be coupled with head-tracking devices, allowing the user to "look around" the virtual 3D by moving his head, eliminating the need for a separate controller.

In one method, a 3D display device presents a user with a pair of stereo images that together create a sensation in the user's mind that the user is observing a 3D image. The pair of stereo images consists of a 2D "left image" which is intended for viewing by the user's left eye and a 2D "right image" indented for viewing by the user's right eye. Various type of glasses can be worn by the user so that the left eye only sees the left image and the right eye only sees the right image.

One method for creating a 3D display utilizes LCD shutter glasses. Glasses containing a liquid crystal are worn that let light through in synchronization with images alternating on a screen, using the concept of alternate-frame sequencing. Real 3D display s display an image in three full dimensions. The most notable difference to stereoscopic displays with only two 2D offset images is that the observer's head and eye movements increase information about the 3-dimensional objects being displayed. Another method for creating 3D displays is autostereoscopy also known as "glasses-free 3D" or "glassesless 3D", which displays stereoscopic images without the use of special headgear or glasses. There are two broad approaches currently used to accommodate motion parallax and wider viewing angles: eve-tracking, and multiple views so that the display does not need to sense where the viewers' eyes are located.

Methods and apparatuses are known for interactive human computer interface using an autostercoscopic display configured to render 3D virtual objects in fixed viewing zones. The system may contain an eye location tracking system for continuously determining both a viewer perceived three dimensional space in relation to the zones and a 3D mapping of the rendered virtual objects in the perceived space in accordance with a viewer eyes position. Additionally, one or more 3D cameras determine anatomy location and configuration of the viewer in real time in relation to said display. An interactive application displays content to the viewer. Furthermore, an interaction processing engine receives information from the eye location tracking system, the anatomy location and configuration system, and the interactive application to determine interaction data of the viewer anatomy with the rendered virtual objects from the display.

SUMMARY OF A FEW EXEMPLARY EMBODIMENTS OF THE INVENTION

Exemplary embodiments of the present invention provide a system and method for interacting with a 3D virtual image containing activatable objects. The system may include a 3D display device that presents to a user a 3D image. Observation of the 3D display device may generate in the user's mind a virtual 3D image consisting of one or more activatable objects, As used herein, an activatable object is a region in the 3D image or video associated with one or more messages activated by user interaction. The activatable objects may be, for example, a 2D or 3D visual element that is perceived by the user as being positioned at a distance from the display device. The activatable objects may be virtual buttons, a virtual keyboard, a 2D or 3D icon, a region in an image or a video. An activatable object may consist of two or more activatable objects. The activatable objects are activated by means of one or more activating objects. An activating object may, for example, include any predefined object that is recognizable by the system, and may be, for example, a stylus, one or more of a user's bands or a portion of a hand, one or more fingers or a portion of a finger such as a finger tip. Activation of one or more of the activatable objects by an activating object, as explained below, results in the generation of a message or a command addressed to an operating system, one or more services, one or more applications, one or more devices, one or more remote applications, one or more remote services, or one or more remote devices.

One or more image sensors (e.g., cameras) are positioned to obtain images of the space in front of the display where the user senses the virtual 3D images are located. Images obtained by the image sensors arc input to a processor. When the user places an activating object at the location in the space in front of the display where the user perceives an activatable object to be located, the user perceives that he is "touching" the activatable object with the activating object. The processor analyzes images obtained by the cameras of the space in front of the device to determine when any of the activating objects are located in the space in front of the display at the location of an activatable object, or when any of the activating objects performs a predetermined series of one or more predetermined motions relative to the activatable object.

When one or more of the activating objects is located in the space in front of the display at the perceived location of an activatable object, or when one or more of the predefined objects has performed a predetermined series of one or more motions relative to one or more of the activatable objects, the activatable objects are activated.

The processor recalls from a memory a message or command that is associated with the activatable object that was activated. Different modes of "touching" the activatable object by the activating object may result in the generation of different messages or commands. The executed command may be, for example, a command that alters the appearance of the 3D image. Such commands may be, for example, resizing an object in the 3D image, changing distances of the objects from the display device in the 3D image, moving an object in the 3D image, or removing an object from the image.

The system of the invention may be associated with a device in which case, the system of the invention allows touch-free interfacing with the device. Examples of device that may incorporate the system of the invention include a mobile phone or tablet, e-reader, portable game console, ultra book, laptop, a personal computer (PC), All-in-One, TV, Set-Top Box, a home appliance, interactive digital signage, digital kiosk, vending machine, ATM, interactive surface, 3D display, an entertainment device, a Smart Home, a kitchen appliance, a media player or media system, a location based device; and a mobile game machine, a pico projector or an embedded projector, a medical display device, and an in-car/in-air Infotainment system, navigation system.

As mentioned above, the message or command generated when an activatable object is activated may depend on how the object was activated. Different modes of activating an activatable object include, for example, pointing at an activatable object, holding an activating object at an activatable object for a predetermined amount of time, clicking on the activatable object, double clicking, clicking from the right side, clicking from the left side, clicking from the bottom, clicking from the top, grasping the object, gesturing towards the object from the right, or from the left side, passing through the object, pushing the object, clapping over the object, waving over the object, performing a blast gesture, performing a tapping gesture, performing a clockwise or counter clockwise gesture over the object grasping the object with two fingers, performing a click-drag-release motion, sliding an icon such as a volume bar. The generated command for scrolling may depend on the speed or acceleration of a performed scrolling motion.

It will also be understood that the system according to the invention may be a suitably programmed computer. Likewise, the invention contemplates a computer program being readable by a computer or processor for executing the method of the invention. The invention further contemplates a machine-readable memory tangibly embodying a program of instructions executable by the machine for executing the method of the invention.

The invention thus provides a computer program product containing instructions for causing a processor to perform a method comprising:
(a) analyzing images obtained by at least one image sensor to determine when one or more predefined activating objects satisfy at least one of the following predefined conditions:
  or more of the activating objects are located at a location in a region of space where a user perceives an activatable object to be located, the activatable object being part of a virtual 3D image presented to a user by a 3D display, and
  one or more of the activating objects has performed one or more series of one or more predefined motions relative to an activatable object; the activatable object being part of a virtual 3D image presented to a user by a 3D display;
(b) when one of the activating objects is located at a location in a region of space where a user perceives an activatable object to be located or when one of the activating objects has performed one or more series of one or more predefined motions relative to an activatable object, generating a predefined message associated with the activatable object.

The computer program product of the invention may be configured to perform the step of analyzing images on images obtained from a single 2D image sensor.

The computer program product of the invention may be configured to perform the step of analyzing images on images obtained from two 2D cameras.

The computer program product of the invention may be configured to perform the step of analyzing images on images obtained from a low resolution 3D camera and a high resolution 2D camera. A predefined motion may be an activating object pointing at an activatable object.

In the computer program product of the invention, a predefined motion may be an activating object pointing at an activatable object and the distance of the activating object from the display device or image sensor is below a predefined distance.

The computer program product of the invention may be further configured to generate a cone having a vertex in the 2D image sensor and extending out from the 2D image sensor towards an activatable object, and one or both of the predefined conditions further requires an activating object is present in the cone. One or both of the predefined conditions may further require an activating object being present in the cone at a distance that is less than a predefined distance from the activatable object or the display device. The cone may have a width in a vicinity of the activatable object that is greater than a width of the activatable object. The cone may have a width in a vicinity of the activatable object that is less than a width of the activatable object.

In the computer program product of the invention, the image sensor may be selected from a camera, a light sensor, an IR sensor, an ultrasonic sensor, a proximity sensor, a CMOS image sensor, a black silicon short wave infrared (SWIR) image sensor and a reflectivity sensor.

In the computer program product of the invention, one or more of the activating objects may be one or more hands, a part of a hand, one or more fingers, one or more parts of a finger, a fingertip, or a stylus.

In the computer program product of the invention, the virtual 3D image may comprise two or more activatable objects located at different distances from the display device.

In the computer program product of the invention, the 3D image may comprise a keyboard and one or more activatable objects may be keys on the keyboard.

In the computer program product of the invention, the processor may be further configured to detect simultaneously two or more differing activatable objects or two or more predefined motions and to activate two or more activatable objects.

In the computer program product of the invention, one or more of the messages may depend on the activating object that activated the activatable object.

In the computer program product of the invention, one or more of the messages may depend on a type of movement of the activating object that activated the activatable object. The type of movement of the activating object may be selected from a swiping motion over the activatable object, performing a pinching motion of two fingers, or pointing towards the activatable object, a left to right gesture, a right to left gesture, an upwards gesture, a downwards gesture, a pushing gesture, a opening a clenched fist, opening a clenched fist and moving towards the image sensor, a tapping gesture, a pushing gesture, a waving gesture, a clapping gesture, a reverse clapping gesture, closing a hand into a fist, a pinching gesture, and a reverse pinching gesture, a gesture of splaying fingers on a hand, a reverse gesture of splaying fingers on a hand, pointing at an activatable object, holding an activating object at an activatable object for a predefined amount of time, clicking on the activatable object, double clicking, clicking from the right side, clicking from the left side, clicking from the bottom, clicking from the top, grasping the object, gesturing towards the object from the right, or from the left side, passing through the object, pushing the object, clapping over the object, waving over the object, performing a blast gesture, performing a tapping gesture, performing a clockwise or counter clockwise gesture over the object grasping the object with two fingers, performing a click-drag-release motion, sliding an icon such as a volume bar.

In the computer program product of the invention, the message may be a command. The command may be a command for scrolling, and the scrolling speed may depend on a speed or acceleration of a performed scrolling motion.

In the computer program product of the invention, the activatable object may be recognized as the activatable object that the user is looking at and the gesture an activating object performs may be applied to the recognized activatable object. The message may be a command that alters the appearance of the 3D image or video. The command altering the appearance of the 3D image may be selected from resizing an object in the 3D image, changing distances between objects in the 3D image, moving an object in the 3D image, changing a distance of the object from the display device, and removing an object from the image. A first motion of an activating object may be performed to indicate an object to be modified, and a second motion may be performed to indicate the alteration in appearance of the indicated object to be performed on the object. Moving one or more objects or changing distances between objects in the 3D image may be performed using a pair of fingers as activating objects and performing a gesture in the 3D image may comprise pointing at two different objects with a different finger and then changing the distance between the two fingers to indicate a change in distance. Resizing an objects may be performed using a pair of fingers as activating objects and performing a gesture in the 3D image changing the distance between the two fingers to indicate a change in size of the object. A movement of an object may be selected from rotating, resizing, dragging, cutting, copying, and pasting the object in the 3D image.

In the computer program product of the invention, the first message may depend on the manner or location that an activating objected touches an activatable object.

in the computer program product of the invention, the message may depend on analysis of a motion vector of the activating object including a speed and acceleration at which a predefined motion is performed.

In the computer program product of the invention, the message may depend on an input voice command.

In the computer program product of the invention, activation of an activatable object may cause a change in the activatable object. The change in the activatable object may be selected from a change in size, a change in color, a change in shape, and a change in location, a change in orientation of the activatable object. The change in the activatable object may be a movement of the activatable object towards the activating object as the activating object approaches activatable object. A change in the activatable object may be the appearance of a depression in the object. A "light touch" may be indicated by a relatively shallow depression, and a "deep touch" may be indicated by a deeper depression.

In the computer program product of the invention, a change in an activatable object may generate animated visual, audio, tactile, or haptic feedback.

The computer program product of the invention may comprise two cameras wherein each camera has a viewing pyramid, and each camera is positioned relative to the display device with face of its viewing pyramid coinciding with the display device. The viewing pyramid of one or more of the cameras may have a viewing angle of 120°. Detecting an activating object in one or more images from a 2D camera may be a trigger for locating the activating object in the 3D space.

In the computer program product of the invention, the processor is further configured to deactivate an activated activatable object. The activatable object may be deactivated when the activating object is moved away from the activatable object, after a predefined amount of time has elapsed, or after the activating object has performed a predefined motion relative to the activatable object.

The invention also provides a device comprising the system of the invention, in this case, the message may be a command executed by the processor is an operating system (OS) command of the device. The OS command may be selected from depressing a virtual key displayed on a display screen of the device; rotating a selection carousel; switching between desktops; running on the central processor unit a predefined software application; turning off an application; turning the speakers on or off; turning the volume up/down; unlocking the device, locking the device, skipping to the next or previous track in a media player or between IPTV channels; controlling a navigation application; unlocking the device, stopping/running an application, starting a call, ending a call, presenting a notification, displaying a notification; navigating in a photo or music album gallery, scrolling web-pages, emails, documents or maps, controlling actions in games, controlling interactive video or animated content, editing video or images, pointing at a map, zooming-in/out on a map or images, painting on an image, pushing an icon toward the display device, or grasping an icon and pulling it out form the display device or rotating it, emulating OS touch commands, multi-touch commands, touch gesture commands, typing, clicking on a video displayed to pause or play, editing video or music commands, tagging a frame or capturing a frame from the video, and performing a gesture to cut a subset of video from a video by same gesture used to tag the start frame and the end frame.

In the device of the invention, the device may be selected from a mobile phone or tablet, e-reader, portable game console, ultra book, laptop, a personal computer (PC), all-in-one, TV, Set-Top Box, a home appliance, interactive digital signage, digital kiosk, vending machine, ATM, interactive surface, 3D display, an entertainment device, a Smart Home, a kitchen appliance, a media player or media system, a location based device; and a mobile game machine, a pico projector or an embedded projector, a medical display device, and an in-car/in-air Infotainment system, navigation system.

In the system of the invention, the processor comprises any one or more of a general purpose processor, a DSP (digital signaling processor), a GPU (graphical processing unit), configured to run on or more software programs.

In the system of the invention, the processor is a dedicated hardware.

In the system of the invention, the processor is a combination of a dedicated hardware and any one or more of a general purpose processor, a DSP (digital signaling processor), and a GPU (graphical processing unit).

The invention also provides a method for activating one or more activatable objects in a 3D image comprising:
  (a) presenting to a user on the 3D display device a virtual 3D image occupying a region of real space in front of the display device, the 3D image comprising one or more activatable objects;
  (b) analyzing images obtained by the one or more cameras to determine when one or more predetermined activating objects are located at a location in the space in front of the display where an activatable object is located or when one or more of the activating objects has performed one or more series of one or more predetermined motions relative so the activatable object; and (c) when one of the activating objects is located at a location in a region of space where a user perceives an activatable object to be located or when one of the activating objects has performed one or more series of one or more predefined motions relative to an activatable object, generating a predefined message associated with the activatable object.

The invention also provides a computer program comprising computer program code means for performing all the steps of the method of the invention when said program is run on a computer or processor. The computer program may be embodied on a computer readable medium.

The invention also provides a system comprising:

(a) a 3D display;
(b) one or more image sensors capturing images of a region of space; and
(c) a processor configured to:
  (i) present to a user on the 3D display a virtual 3D image perceived by a user to occupy a region of space, the 3D image comprising one or more activatable objects;
  (ii) analyze images obtained by at least one image sensor to determine when one or more predefined activating objects satisfy at least one of the following predefined conditions:
    one or more of the activating objects are located at a location in the region of space where a user perceives an activatable object to be located, the activatable object being part of a virtual 3D image presented to a user by the 3D display, and
    one or more of the activating objects has performed one or more series of one or more predefined motions relative to an activatable object; and
  (iii) generate a predefined message associated with the activatable object when one or more of the activating objects are located at a location in the region of space in front of the display where an activatable object is located or when one or more of the activating objects has performed one or more series of one or more predefined motions relative to the activatable object.

The invention also provides a device comprising the system of the invention.

The invention also provides a computer implemented method comprising:

(a) analyzing images obtained by at least one image sensor to determine when one or more predefined activating objects satisfy at least one of the following predefined conditions:
  one or more of the activating objects are located at a location in a region of space where a user perceives an activatable object to be located, the activatable object being part of a virtual 3D image presented to a user by a 3D display, and
  one or more of the activating objects has performed one or more series of one or more predefined motions relative to an activatable object; the activatable object being part of a virtual 3D image presented to a user by a 3D display (b) generate a predefined message associated with the activatable object when one or more of the activating objects are located at a location in the region of space in front of the display where an activatable object is located or when one or more of the activating objects has performed one or more series of one or more predefined motions relative to the activatable object.

The invention also provides a computer program comprising computer program code means for performing all the steps of the method of the invention when said program is run on a computer. The invention also provides a computer program comprising computer program code means for performing all the steps of the method of the invention when said program is run on a computer.

The computer program may be embodied on a computer readable medium.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
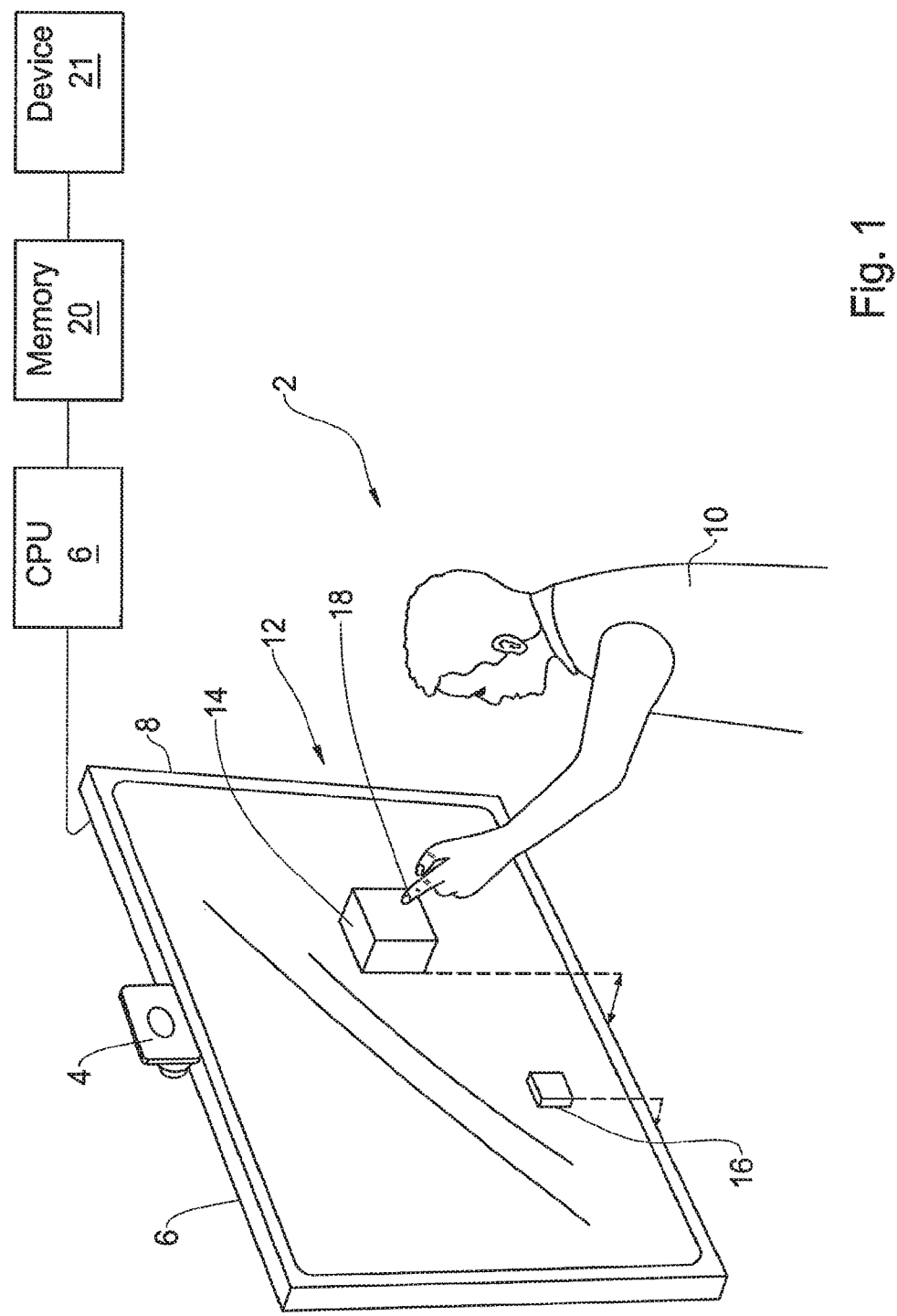
FIG. 1 shows an exemplary system for interacting with a 3D display in accordance with one embodiment of the invention.

FIG. 1 shows a schematically a system 2 for interacting with a virtual 3D image containing one or more activatable objects in accordance with one embodiment of the invention. The system 2 comprises a 3D display device 8, a processor 6 having a memory 20, and one or more cameras 4. The image sensor may be for example, a camera, a light sensor, an IR sensor, an ultrasonic sensor, a proximity sensor, a CMOS image sensor, a black silicon short wave infrared (SWIR) image sensor and a reflectivity sensor.

Figure 2:
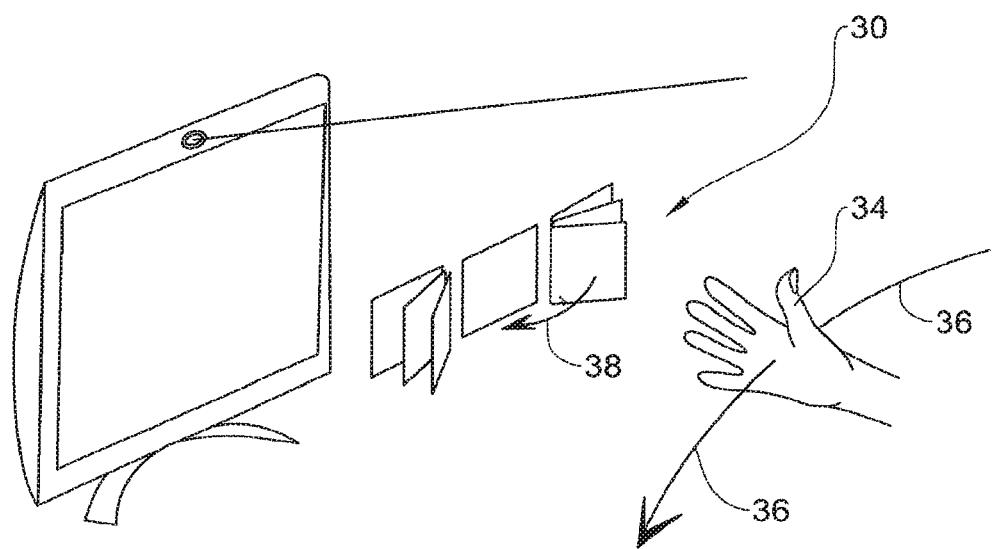
FIG. 2 shows an exemplary system of another embodiment of the invention in which a displayed virtual 3D image comprises a music album library.

FIG. 2 shows the system 2 in use. The 3D display device presents to a user 10 a 3D image generated by the processor 6. Observation of the 3D display device generates in the user's mind a virtual 3D image comprising one or more activatable objects such as the activatable objects 14 and 16 which she user perceives as being located in front of the display device 8. The virtual 3D image may be a virtual keypad or keyboard and the 3D activatable objects may be keys on the keypad. The one or more cameras 4 are positioned to obtain images of the space in front of the display where the user senses the virtual 3D image is located. The cameras 4 may be 2D or 3D cameras, or a combination of 2D and 3D cameras. In one embodiment, the processor 6 is for, example, one or more of a general purpose processor, a DSP (digital signaling processor), a GPU (graphical processing unit), configured to run one or more software programs. Alternatively the processor may be a dedicated hardware. As yet another alternative, the processor 6 may be a combination of a dedicated hardware and any one or more of a general purpose processor, a DSP (digital signaling processor), a GPU (graphical processing unit).

Images obtained by the camera 4 are input to the processor 6. When the user places one or more predetermined activating objects at one or more locations in the space in front of the display where the user perceives the activatable objects 14 and/or 16 to be located, the user perceives that he is "touching" the activatable objects with the activating object. The activating object may include any object predefined to be recognized when signals are transmitted from an image sensor to the processor 6. Examples of activating objects may include, but are not limited to, a stylus, one or more of the user's hands or a portion of a hand, or one or more fingers or a portion of a finger such as a finger tip 18. The processor 6 analyzes images obtained by the camera 4 of the space in front of the display to determine when any of the activating objects located in the space in front of the display at the location of an activatable object, or when any of the activating objects perform a predetermined series of one or more predetermined motions relative to the activatable object. Analysis of the images to detect the predetermined object may be performed by the processor 6, for example, as disclosed in WO2005/091125 or in WO 2010/086866.

The system 2 may further comprise a touch screen that may be capable of presenting a 3D image. The interaction by the user can be performed by touching the screen and/or via an interaction that is touch-free.

When one or more of the activating objects is located in the space in front of the display at the location of an activatable object, or when one or more of the activating objects has performed a predetermined series of one or more motions relative to one or more of the activatable objects, such as the activatable objects 14 and 16, the activatable objects may be activated. A predetermined motion may be for example, a swiping motion over the activatable object, performing a pinching motion of two fingers, or pointing towards the activatable object, a left to right gesture, a right to left gesture, an upwards gesture, a downwards gesture, a pushing gesture, a opening a clenched fist, opening a clenched fist and moving towards the image sensor (also known as a "blast" gesture), a tapping gesture, a pushing gesture, a waving gesture, a clapping gesture, a reverse clapping gesture, closing a hand into a fist, a pinching gesture, and a reverse pinching gesture, a gesture of splaying fingers on a hand, a reverse gesture of splaying fingers on a hand, pointing at an activatable object, holding an activating object at an activatable object for a predetermined amount of time, clicking on the activatable object, double clicking, clicking from the right side, clicking from the left side, clicking from the bottom, clicking from the top, grasping the object, gesturing towards the object from the right, or from the left side, passing through the object, pushing the object, clapping over the object, waving over the object, performing a blast gesture, performing a tipping gesture, performing a clockwise or counter clockwise gesture over the object grasping the activatable object with two fingers, performing a click-drag-release motion, or sliding an icon such as a volume bar. The speed of a scrolling command can depend up, the speed or acceleration of a scrolling motion. Two or more activatable objects may be activated simultaneously using different activating objects, such as different hands or fingers, or simultaneously using different gestures.

The activatable object may be recognized as the activatable object that the user is looking at, and the gesture the user performs can be applied to the recognized activatable object. Methods and systems for tracking eye movements are well known in the art.

Activation of one or more of the activatable objects by an activating object, as explained below, may result in the generation of a message or a command addressed to an operating system, one or more services, one or more applications, one or more devices, one or more remote applications, one or more remote services, or one or more remote devices. The processor may, for example, recall from a memory 20 a message or command that is associated with the activatable object that was activated, and possibly the way the activatable object was activated. For example activating an activatable object with different activating objects or different motions or gestures by the activating object may result in a differing associated command. Tire message or command may also depend on a voice command provided during activation of the activatable object by the activating object. The processor 6 then generates the recalled message or command, A command can thus be executed without the need for any physical input device such as keyboard or computer mouse. The activatable object that was activated may be deactivated when, for example, the predetermined object is moved away from the activatable object, after a predetermined amount of time has elapsed, or performing predetermined gesture near the object.

The executed command may be, for example, a command that alters the appearance of the 3D image. Such commands may be, for example, resizing an object in the 3D image, changing the shape or color of an object, changing distances between objects in the 3D image, moving an object in the 3D image, placing an object inside or on top of another object, or removing an object from the image. In this case, a first gesture may be performed to indicate the object to be modified, and a second gesture may be performed to indicate the modification to be performed on the object. Resizing or moving objects or changing distances between objects in the 3D image may be done, for example, by using a pair of fingers as activating objects and performing a gesture in the 3D image comprising pointing at two different objects with different fingers and then changing the distance between the two fingers to indicate a change in distance between the objects. Movement of an object may be, for example, rotating, dragging cutting, copying, or pasting the object in the 3D image. FIG. 2 shows, as an example, the system 2 in which a displayed virtual 3D image comprises a library of music albums 30. A swiping gesture 36 performed by a user's hand 34 in the direction indicated by the arrow 36 can be used to scroll between the music albums 30 in the direction indicated by the arrow 38, while a swiping gesture of the hand 34 in the direction opposite to that of the arrow 36 can. be used to scroll between music albums in the direction opposite to the direction of the arrow 38. The speed of scrolling can be correlated with the speed or acceleration of the swiping gesture. Thus, a relatively slow swiping gesture would scroll to the next album, while a relatively fast swiping gesture would cause several albums to scroll in rapid succession.

The system 2 may be associated with a device 21, in which case the command executed by the processor 6 upon activation of an activatable object may be an operating system (OS) command of the device 21. Examples of OS commands include depressing a virtual key displayed on a display screen of the device; rotating a selection carousel; switching between desktops; running on the central processor unit a predetermined software application; turning off an application; turning the speakers on or off; turning the volume up/down; skipping to the next or previous track in a media player or between IPTV channels; controlling a navigation application; unlocking the device, stopping/running an application, starting a call, ending a call, presenting a notification, displaying a notification; navigating in a photo or music album gallery, scrolling web-pages, emails, documents or maps, controlling actions in games, controlling interactive video or animated content, editing video or images, pointing at a map, zooming-in/out on a map or images, painting on an image, pushing an activatable object toward the display device, pulling an activatable image away from the display device, moving an activatable image to a new location, copying, cutting, removing, altering or rotating any visual representation. Additional OS commands include emulating: touch OS commands, multi-touch OS commands, touch gesture OS commands. Further OS commands include typing, clicking on a video displayed to pause or play, editing video or music commands, tagging a frame or capturing a frame from the video, performing a gesture to cut a subset of video from a video by same gesture used to tag the start frame and the end frame, or one gesture to start frame and a different gesture to end frame.

The executed command may depend upon the activating object activating the activatable object, so that different activating objects activating the same activatable object may cause a different command to be executed. Similarly, different gestures or movements of an activating device may cause a different command to be executed.

The executed command may also depend on how or where an activating objected "touches" an activatable object. The command associated with activation of an activatable object may depend upon how the user "touches" the activatable object. For example, a "light touch" and a "deep touch" may result in a different command being executed.

Activation of an activatable object may be indicated to the user, for example, by a change in color, shape or location of the activatable object. An activatable region may move towards the activating object as the activating object approaches activatable object. Touching of an activatable object may be indicated by the appearance of a depression in the object. A "light touch" may be indicated by a relatively shallow depression, and a "deep touch" may be indicated by a deeper depression. Activation of the activatable object may also be indicated to the user, for example, by still or animated visual, audio, tactile, or haptic feedback. Tactile feedback may be provided, for example, by radiating airborne ultrasound, and producing pressure fields onto the user's hand or finger.

Figure 3:
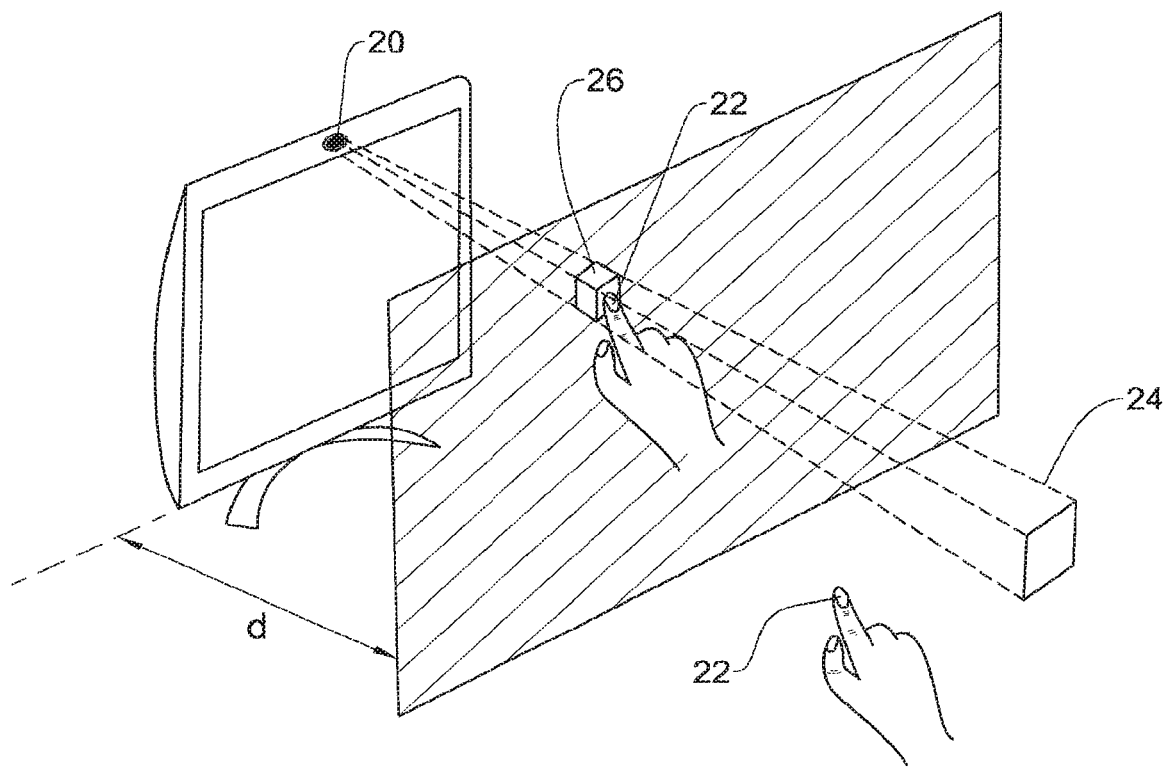
FIG. 3 shows an exemplary implementation of a further embodiment of a system of the invention comprising a single 2D camera.

As shown in FIG. 3, the system of the invention may comprise a single 2D camera 20 that obtains 2D images of a 3D viewing space in front of the display. 2D images obtained by the 2D camera 20 represent a projection of the viewing space onto a 2D surface. A cone 24 can be generated having a vertex in the camera and extending out from the camera towards an activatable object, such as the activatable object 26 that is localized in the 3D space in front of the display. The cone 24 in the vicinity of the activatable object 26 may be wider than, the same size as, or thinner than the width of the object 26. When an activating object, such as a fingertip 22 appears in the cone 24 of the activatable object 26 pointing for a predetermined amount of time at the activatable object 26, or performs a predetermined gesture, such as a clicking motion, the system 2 can determine that the activating object is activating the activatable object. Alternatively, the system may be configured to activate the activatable object when the activating object is pointing at the activatable object, or is performing a predetermined gesture, and the distance of the activating object from the display device, or activatable object, is less than a predetermined distance d. Whether the activating object is within or beyond the distance d from the display device or the activatable object can be determined for example, from a 2D image, from the size or the width of the activating object in pixels in the image.

Another example of an implementation of the invention can provide higher accuracy of the location and motion vector of an activating object by utilizing two 2D cameras having overlapping viewing spaces that optimized to reduce the processor resource requirements. One method for locating an activating object in a 3D space in front of the display in the intersection of the viewing spaces of the two 2D cameras involves computing a low resolution 3D mapping of the 3D space from a pair of images obtained from the two cameras. 3D regions in the 3D mapping suspected of containing an activating object are identified. The suspected regions are typically regions in the 3D mapping that are relatively close to the cameras. The corresponding 2D regions in the two images suspected of containing the activating object are then found. The location of the activating object in the first and second image is specified by means of 2D coordinates, (X1, Y1) and (X2, Y2), respectively. A high resolution 3D mapping is then generated only in the region of the activating object, from which the 3D coordinates (X,Y,Z) of the activating object can be calculated.

Another method for locating an activating object in 3D space in the intersection of the viewing spaces of two 2D cameras involves locating the activating object in a first image to obtain the 2D coordinates (X,Y) of the activating object in the image. These coordinates are then used to locate the activating object in the second image. A 3D mapping is then calculated only in the region of the activating object from the 2D coordinates of the activating object in the two images.

In another example of an implementation of the invention, the (X,Y) of an activating object is obtained by recognizing the activating object in an image from a 2D camera, and the extraction of the Z coordinate is obtained as explained above at a lower frame rate in comparison to the frame rate of the extraction of (X,Y).

In another example of an implementation of the invention, the location of an activating object is determined in one or more images from a 2D camera, and only when activating object is detected, any of the above methods is implemented to locate the activating object in the 3D space.

Yet another method for locating an activating object in 3D space in the intersection of the viewing space of two 2D cameras involves calculating a low resolution 3D mapping from a pair of images. The location of the activating object in the first and second image of a pair of two 2D images determines a first and second 3D region, respectively, in the 3D mapping. The activating object is then located in the 3D mapping in the intersection of the first and second 3D regions.

Another example of an implementation of the invention utilizes a low resolution 3D camera and a high resolution 2D camera. The 3D camera provides low resolution 3D coordinates (X,Y,Z) of the activating object, where Z is the distance of the object from the screen. The 2D camera provides high resolution 2D coordinates (X, Y) of the object in an image. High resolution X and Y coordinates together with a low resolution Z coordinate is often sufficient to locate the object with sufficient accuracy.

In another implementation of the invention, two cameras are used, that may be 2D or 3D cameras or a combination of a 2D and a 3D camera. Each camera has a viewing pyramid, and in this implementation, each camera is positioned so that a face of its viewing pyramid coincides with the display screen. In this way, there is no "dead space" adjacent to the screen that is not in the viewing pyramid of both cameras. In this implementation, the viewing pyramid may have a wide viewing angle, such as an angle of 120°.

The foregoing description is exemplary only and is not to be interpreted as restrictive of the invention, as claimed.

The invention claimed is:

1. A touch-free gesture recognition system, comprising:
   at least one processor configured to:
   display a virtual image that includes at least one activatable object, the activatable object having at least two activating modes, wherein a first mode is associated with a first mode of activating object, and a second mode is associated with a second mode of activating object;
   correlate a location of an activating object with a location of the activatable object; and
   implement a first action when the location of the activating object correlates to the location of the activatable object and the activating object performs a first type of movement, and implement a second action when the location of the activating object correlates to the location of the activatable object and the activating object performs a second type of movement.

2. The touch-free gesture recognition system of claim 1, wherein the first action includes at least one of a first message or a first command, and the second action includes at least one of a second message or a second command.

3. The touch-free gesture recognition system of claim 1, wherein the first and second modes are each associated with at least one of a left side of the activatable object, a right side of the activatable object, a bottom side of the activatable object, and a top side of the activatable object.

4. The touch-free gesture recognition system of claim 3, wherein the at least one processor is further configured to:
   detect a predetermined motion associated with the activating object including at least one of a right side click, a left side click, a bottom side click, a top side click, a grasp of the activatable object, a gesture toward the activatable object from the left side, a gesture toward the activatable object from the right side, and a pass through the activatable object.

5. The touch-free gesture recognition system of claim 1, wherein the at least one processor is further configured to:
   detect a voice command and select the first action and the second action, based, at least in part, on the voice command.

6. The touch-free gesture recognition system of claim 1, wherein the first and second modes are each associated with at least one of a light touch to the activatable object and a deep touch to the activatable object.

7. The touch-free gesture recognition system of claim 1, wherein the at least one processor is further configured to:
   detect the activatable object based, at least in part, on eye movements of the user.

8. The touch-free gesture recognition system of claim 1, wherein the at least one processor is further configured to:
   adjust the display of the virtual image as the activating object moves closer to the activatable object.

9. The touch-free gesture recognition system of claim 1, wherein, to correlate the location of the activating object with the location of the activatable object, the at least one processor is further configured to:
   determine whether the activating object is in a virtual cone that has a vertex associated with the image sensor and that extends through at least a portion of the activatable object.

10. The touch-free gesture recognition system of claim 9, wherein, to correlate the location of the activating object with the location of the activatable object, the at least one processor is further configured to:
    determine whether the activating object is less than a predetermined distance from at least one of the activatable object or a display device associated with the activatable object.

11. The touch-free gesture recognition system of claim 1, wherein, to correlate the location of the activating object with the location of the activatable object, the at least one processor is further configured to:
    determine whether the activating object is pointing at the activatable object and is less than a predetermined distance from the activatable object or a display device associated with the activatable object.

12. The touch-free gesture recognition system of claim 1, wherein, to correlate the location of the activating object with the location of the activatable object, the at least one processor is further configured to:
    determine whether the activating object is performing a predetermined gesture and is less than a predetermined distance from the activatable object from a display device associated with the activatable object.

13. A non-transitory computer-readable medium including instructions that, when executed by at least one processor, cause the processor to perform operations, comprising:
    displaying a virtual image that includes at least one activatable object, the activatable object having at least two activating modes simultaneously activatable, wherein a first mode is associated with a first mode of activating object and a second mode is associated with a second mode of activating object;
    correlating a location of the activating object with a location of the activatable object; and
    implementing a first action when the location of the activating object correlates to the activatable object and the activating object performs a first type of movement, and implementing a second action when the location of the activating object correlates to the activatable object and the activating object performs a second type of movement.

14. The non-transitory computer-readable medium of claim 13, wherein the first action includes at least one of a first message or a first command, and the second action includes at least one of a second message or a second command.

15. The non-transitory computer-readable medium of claim 13, wherein the instructions, when executed by at least one processor, further cause the processor to perform at least one operation comprising:
    detecting a voice command; and
    selecting at least one of the first action and the second action, based, at least in part, on the voice command.

16. The non-transitory computer-readable medium of claim 13, wherein the first and second activating modes are each associated with at least one of a light virtual touch to the activatable object and a deep virtual touch to the activatable object.

17. The non-transitory computer-readable medium of claim 13, wherein the instructions, when executed by at least one processor, further cause the processor to perform at least one operation comprising:
    detecting the activatable object based, at least in part, on an eye movement of the user.

18. The non-transitory computer-readable medium of claim 13, wherein the instructions, when executed by at least one processor, further cause the processor to perform at least one operation comprising:
    adjusting the display of the virtual image as the activating object moves closer to the activatable object.

19. The non-transitory computer-readable medium of claim 13, wherein, to correlate the location of the activating object with the location of the activatable object, the instructions, when executed by at least one processor, further cause the processor to perform at least one operation comprising:
determining whether the activating object is pointing at the activatable object and is less than a predetermined distance from the activatable object or from a display device associated with the activatable object.

20. A touch-free gesture recognition method, comprising:
displaying a virtual image that includes at least one activatable object, the activatable object having at least two
activating modes simultaneously, wherein a first mode is associated with a first mode of activating object, and a second mode is associated with a second mode of activating object;
correlating a location of the activating object with a location of the activatable object; and
implementing a first action when the location of the activating object correlates to the activatable object and the activating object performs a first type of movement, and implementing a second action when the location of the activating object correlates to the activatable object and the activating object performs a second type of movement.

* * * * *